United States Patent [19]

Pasternak

[11] Patent Number: 4,531,292
[45] Date of Patent: Jul. 30, 1985

[54] FOODSTUFFS IMAGING PROCESS AND APPARATUS

[75] Inventor: Eliezer Pasternak, St. Louis, Mo.

[73] Assignee: Joytronix, Inc., Santa Clara, Calif.

[21] Appl. No.: 466,060

[22] Filed: Feb. 14, 1983

[51] Int. Cl.³ .................... B43L 13/00; A23G 3/28
[52] U.S. Cl. ............................ 33/18 R; 33/32 F; 426/383
[58] Field of Search ............ 33/18 R, 20 R, 20 C, 33/20 D, 23 R, 23 B, 23 E, 23 F, 23 M, 32 F; 426/383

[56] References Cited

U.S. PATENT DOCUMENTS

| | | | |
|---|---|---|---|
| 3,088,788 | 5/1963 | Brown, Jr. et al. | 33/32 F |
| 3,608,198 | 9/1971 | Ludwick, III et al. | 33/18 R |
| 3,989,933 | 11/1976 | Inghilleri | 33/20 D |
| 4,024,287 | 5/1977 | Golchert | 426/383 |
| 4,057,336 | 11/1977 | Malinge | 33/20 D |
| 4,285,978 | 8/1981 | Quinlivan | 426/383 |
| 4,317,286 | 3/1982 | Elfick et al. | 33/20 D |
| 4,455,320 | 6/1984 | Syrmis | 426/383 |

FOREIGN PATENT DOCUMENTS 875060  9/1942  France ............................ 33/18 R Primary Examiner—Willis Little
Attorney, Agent, or Firm—Paul M. Denk

[57] ABSTRACT

In an apparatus for reproducing images onto foodstuffs or the like, and the process for performing such operation, a housing includes the various electronic controls for sequencing the operations of the apparatus, a turntable for holding the especially prepared foodstuff or sheet upon which the image is to be scribed is located upon the turntable, a supporting device disposed for uniform rotation with the turntable holds the photograph or other pictorial member from which the image for reproduction is derived, the combination of light and optical members for illuminating and visually directing the reproducible image to the photosensitive means that cooperates in combination with the electronic controls for precisely manipulating an electromechanical or electronic scribing instrument for either directly or through transfer paper a reproducing of a facsimile of the pictorial image directly onto the foodstuff or the like; the foodstuff or related composition upon which the image is reproduced may comprise a fibrous material, preferably edible, and including in combination of manufacturers confections mixed with a fibrous composition, or the like, so that it can be easily manipulated and handled either manually or by machine prior to, during, and after imaging processing, and can be likewise applied, as for example, to the surface of a cake to be consumed therewith; a cassette including a combination of the specially prepared foodstuff, and the transfer paper from which one or more colors may be transferred by means of the stylus or etching device to the surface of the foodstuff has been devised to facilitate the routine usage of this imaging producing apparatus either domestically, commercially, or industrially during its intended application.

20 Claims, 15 Drawing Figures

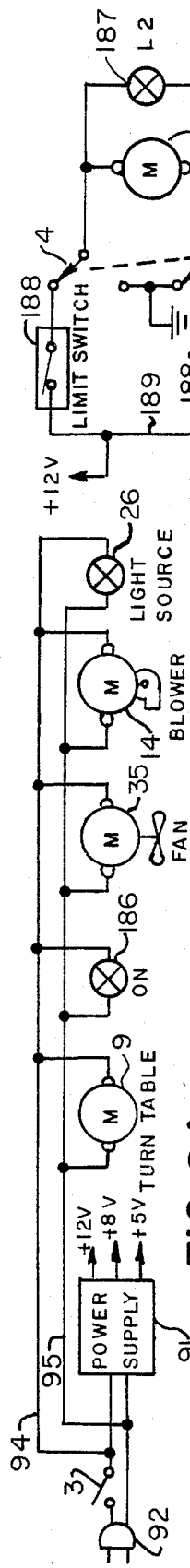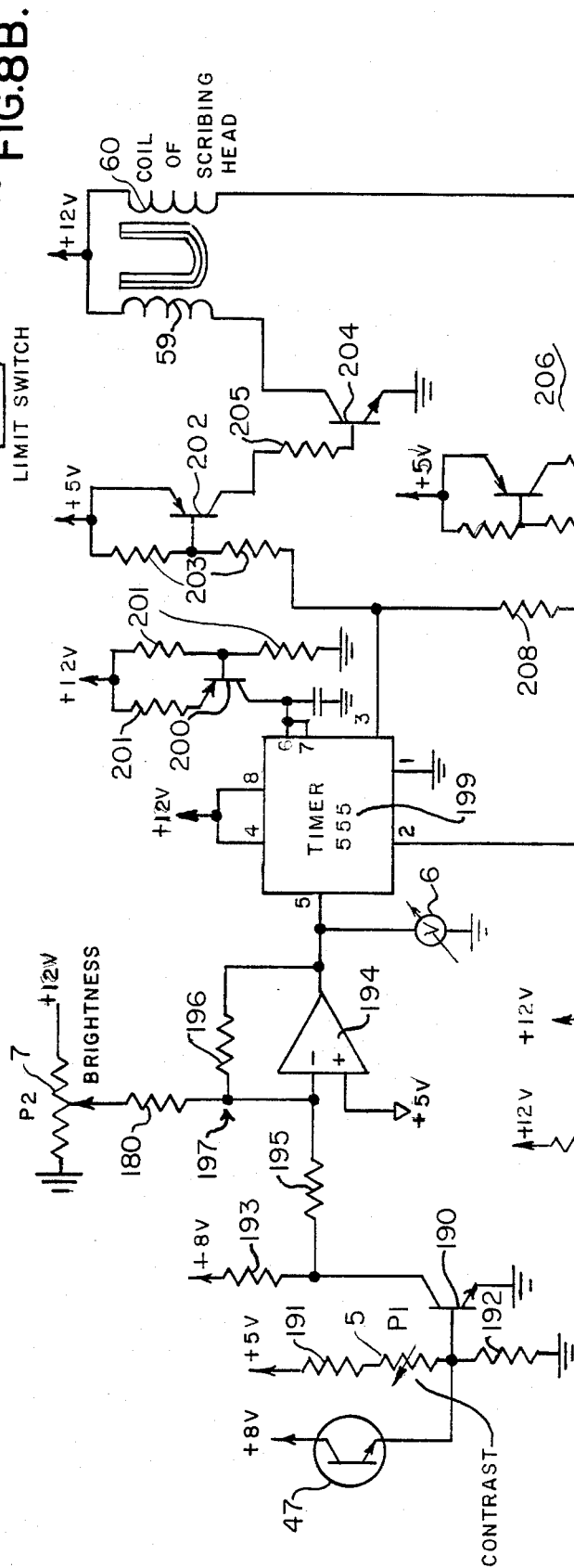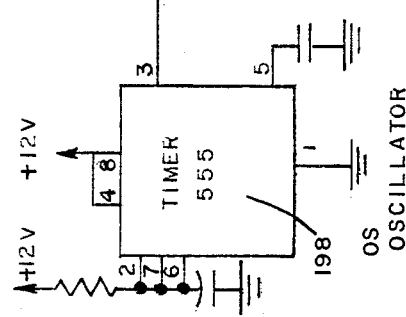

FOODSTUFFS IMAGING PROCESS AND APPARATUS

BACKGROUND OF THE INVENTION

This invention relates to both an apparatus, and the method of its usage, for copying and reproducing an image onto foodstuffs, or the like, such as cakes, pies, ice creams, cheese, and the materials, principally for decorating purposes, but more particularly provides for the transfer rather visually and accurately of any pictorial representation desired for reproduction upon the surface of any related type of aforementioned items.

The prior art concerned with the application of decorative means to various foodstuffs, such as the surface of a cake, essentially derived over the years as an individual craft of the artisans skilled efforts in providing personalized decorations to such components. For example, early ornamentations provided to cakes, cookies, and related types of foodstuffs, fairly well depended upon the skill, dexterity, and imagination of the baker, or those craftsmen working for him, in order to get any facsimile of decoration upon the finished cake product, or the like. The problem is, and which now prevails in many areas where personal talents are required, concerns finding such skilled artisans in this day and age who are still dedicated towards perfecting and performing their developed arts; and seeking and find such talent is very difficult.

Hence, and as a result, various substitutes have by necessity been devised for use for decorating food products, and the process has been relegated to a manual manipulation, obviating the need for the talent of any artisan. For example, in the U.S. Pat. No. 2,353,594, to Seagren, there is disclosed means for decorating edible products, and in this particular instance, the product generally comprises a bas relief type of a mold that can be supplied with a quantity of edible soluble material that is detachably secured thereto and which can be transferred onto the surface of a cake, as shown, for quickly adding decorativeness to the shown food product. Obviously, while this means for decorating cakes certainly accellerates the time needed to perform this particular task, once the mold or instrument is constructed for transferring the particular image desired, only that image alone can be transferred during subsequent applications. Hence, both the means for decoration, and the image produced, is governed by a fixed parameter that does not allow for variation in the reproduction of the image as derived from this prior art type of invention.

Various other food decorating proccesses have been given consideration, more contemporarily, such as shown in the U.S. Pat. No. 4,024,287, as devised by Golchert. The disclosed process provides a method for decorating various confectionery food items such as cakes, and the like, through the application of a thin transfer medium through a designed transfer sheet that can be applied, as through rubbing, as shown and described, to the surface of a food product. This particular food concept, in the prior art, is not too unlike the method in which children transfer tattoos, or the like, from a transfer sheet to the surface of their skin, or clothing, in order to obtain a transposition of image. See also Pat. No. 683,765, that issued to Howard. But, once again, the image obtained is obviously fixed and predetermined by the pictorial representation originally applied to the transfer sheet itself. Variations on it cannot be obtained, unless a differing image is previously imprinted onto the transfer sheet itself.

Various other prior art transferring devices have been considered in the prior art, such as the pressure-sensitive reusable transfer element shown in the U.S. Pat. No. 3,904,803, to Brown, et al, but the identified invention is totally unrelated to the culinary arts, and has nothing to do with the field of edible products. As explained therein, the reusable transfer element is of the squeeze-out type known in the carbon paper and ribbon field, includes a bonding layer of a resinous ink material being applied to it, wherein the composition comprises a water-soluble film forming binder material and having a micro-porous surface for acceptance of the ink layer in a particular pattern for use during pressure-sensitive applications.

It is, therefore, the principle object of this invention to provide means for transferring an image onto the surface of edible foodstuffs, or other material, through the use of the apparatus of this invention wherein the parameters for the design to be transferred can be varied simply through a replacement of the photographic image, or other design, functioning as the source image for transfer during performance of the invention.

Another object of this invention is to provide an automatic mechanical, chemical, optical and electronic method for the transfer of any desired image from a photograph or other picture to an edible surface or the like while obviating the need for any skilled or artistic performance during application of the process.

Still another object of this invention is to provide an apparatus that uniquely combines all or part of the above stated elements for the transfer of images to the surface of a cake, or other foodstuff.

Another object of this invention is the method for transferring a highly accurate image for reproduction upon the surface of an edible item and which can be performed repeatedly through a totally automated process.

Yet another object of this invention is to provide a mechanical apparatus for use for either scribing directly to, or for transposition of chemical or other edible dyes upon a transfer sheet to the surface of a cake, or the confections utilized as a surface coating upon such a foodstuffs, or related type of items.

Yet another object of this invention is to furnish the construction, and its operation, for a uniquely developed scribing instrument useful for either directly transcribing, or cooperating with transfer means, for reproducing a source image upon another and discrete surface.

Still another object of this invention is to provide means for conveniently forming and transferring an image to a remote source after its optical derivation from the photograph, digital storage, a live scene, or the like, as the initial image of focus during a processing.

Yet a very convenient object of this invention is to transfer the portrait of a person, such as a birthday or anniversary celebrant, directly and clearly onto the confectioned surface of a cake, or the like.

Still another object of this invention is to mechanize the processing of layered material, such as a layer of textured confection, to reproduce an image or other pictorial representation thereon, for its ready application to the surface of a cake, or the like, as being decorated.

Yet another object of this invention is to develop into cassette form the various means used in the automated transfer of and reproduction upon a foodstuff or the like of an image from a remote source.

Another object of this invention is to provide the means for reproducing in multi-colored medium an image onto the surface of foodstuff, or related item, from a remote source.

Still a primary object of this invention is to provide the desired constituent of a receptor foodstuff upon which an image from a differing source is reproduced.

A further object of this invention is to provide a novel process for performing image transferring with respect to foodstuffs.

These and other object will become more apparent to those skilled in the art upon reviewing the summary of this invention, and upon undertaking a study of the description of its preferred embodiment, in view of the drawings.

SUMMARY OF THE INVENTION

This invention contemplates the definition of mechanical means for use in image transfer, and more specifically as constructed for reproducing rather accurately an image from a photograph, or the like, directly to a specially prepared foodstuff, to enhance it decoratively, informatively, or for other purposes. This invention essentially comprises a combination of principle features, which either taken individually have their own developed useful entity, but which function under the terms and conditions of this invention to provide in combination an overall image reproducing apparatus for use for the automated decorating of cakes, foodstuffs, or the like. The essential features of this invention include a mechanical apparatus that is useful for taking, optically, images from a pictorial representation, and transferring the same both optically and electronically to a remote source for scribing or utilizing other means for transfer of the conveyed image to another and different surface.

A second feature of this invention considers the formation of a unique foodstuff in the category of a disc or other sheet material fabricated from a fibrous confection, and which may have the reproduced image directly scribed upon it, or have it transferred through transfer medium to its surface, so that the now imaged sheet can be applied to the surface of a cake, or other foodstuff, for ready usage, as for example, for use in a birthday or anniversary celebration, and to be conveniently consumed.

Thirdly, the invention envisions the formation of a cassette type of means that may incorporate both the foodstuffs sheet, in cooperation with the transfer medium, such as a carbon like sheet of material, and which contains the colorable mediums to be transferred to the surface of the foodstuffs, so that the entire process can be commercialized for ready application by a user of the inventive apparatus, and regardless whether it be the homemaker, the commercial establishment, or applied during industrial operations.

The apparatus of this invention includes a base member and housing having the combination of a turntable rotatably mounted thereon, and having further arranged in close proximity therewith an electro-mechanical or other electronically operated scribing instrument that may apply a reproduced image directly to the surface of the foodstuffs sheet as conveniently arranged upon the turntable, or function as a means for scribing through a transfer sheet of singular or multiple colored inks to the foodstuffs surface. More particularly, the operations of the scribing means are controlled electronically through signals received from an optical means that receives the picture and image being reproduced from a source, and which source likewise rotates in unison with the turntable, so that received visual images conveyed by means of optics to a phototransistor or similar instrument can produce electric signals in direct sequence that determines the intensity of functioning of the scribing means, as during its performance of an actual transfer of an image to the foodstuff's surface.

The scribing instrument itself comprises a uniquely constructed electro-mechanical means, having a ferromagnetic core incorporating at least one electromagnet that controls the vibratory like pivoting of a scriber arm arranged within an air gap constructed along one side of an arranged core. A scribing instrument, such as a stylus, or the like, is mounted by resilient means upon the underside of the pivot arm, and depending upon the quality and intensity of the signal transferred to the electromagnetics, the breadth of the scribe lines generated through movement of the stylus will be either intense, to provide a more darkened facsimile of the point transfer of the image at that instance, or the vibrations will be weak, thereby lightening the intensity of the transfer. This occurs regardless whether the transfer by way of the stylus is being made directly into the surface of the foodstuff, or as in the preferred embodiment, through the application of transfer mediums such as specially designed edible dye created carbon type papers that can transfer multiple colors to the surface of the foodstuff during application of this apparatus, through its electro-mechanically vibrated stylus.

The apparatus, and more particularly its optics, may include various filters, such as infrared rejectors, that refine the image optically derived from the source photograph, so as to assure that a commercial grade image will be transferred onto the surface of the foodstuff sheet.

Various electronic controls cooperating in combination with the mechanical apparatus, its optics transfer means, all in order to assure the proper operation of all of the electrical instrumentations included within the functional apparatus, in addition to providing the proper processing of the representative signal that renders functionally the scribing instrument of this invention.

As previously briefly explained, the foodstuffs itself utilized in performance of this invention preferably includes a specially derived confection, and whether it be of any of the various flavors readily available upon the market, such as chocolate, vanilla, or the like, but one which has been specially treated to enhance its fibrous content, such as through the application a more fibrous like foodstuffs, or protein source, such as the spun protein derived from the processed soybean, or through the addition of a more likely available fibrous source such as marshmallow, or any foodstuffs of related texture. The particular combinations of these compositions when blended into a foodstuffs, to develop the texture needed for fabrication of the sheets of the material, are more aptly described in a subsequent part of this application.

In addition to the foregoing, the invention contemplates the greater commercialization of this particular invention, by fabricating the apparatus not only as an industrial instrument, but one which can also be made reasonably portable for ease of usage and application by the homemaker. In either event, the foodstuffs may be combined into a cassette like instrument, that is pre-packaged to contain the sheet of edible foodstuffs, as previously explained, and having closely aligned to it various transfer sheets that are useful for the ready imprinting of an edible dye, of one or more colors, directly to the surface over the foodstuffs, upon installation of the cassette within the apparatus of this invention.

The combination of all of the components of this invention, as previously explained, and the novel and enhanced results obtained therefrom, cannot really be appreciated until one observes the beneficial results obtained from use of this invention. Attention is directed to FIG. 13 wherein is depicted an actual reproduction through mechanical scribing of a very clear image of the inventor's daughter onto the surface of a cake through usage and application of this invention. The results, as can be seen, are quite startling.

BRIEF DESCRIPTION OF THE DRAWINGS

In the drawings,

FIG. 8a provides a circuit diagram of the electrical controls of this invention;

FIG. 8b provides a circuit diagram of the limit switches and motor means for providing some control for the scribing instrument of this invention;

FIG. 8c provides an example of a circuit diagram for the electronic processing of the image that may be used in select embodiment of this invention;

DESCRIPTION OF THE PREFERRED EMBODIMENT

Figure 1:
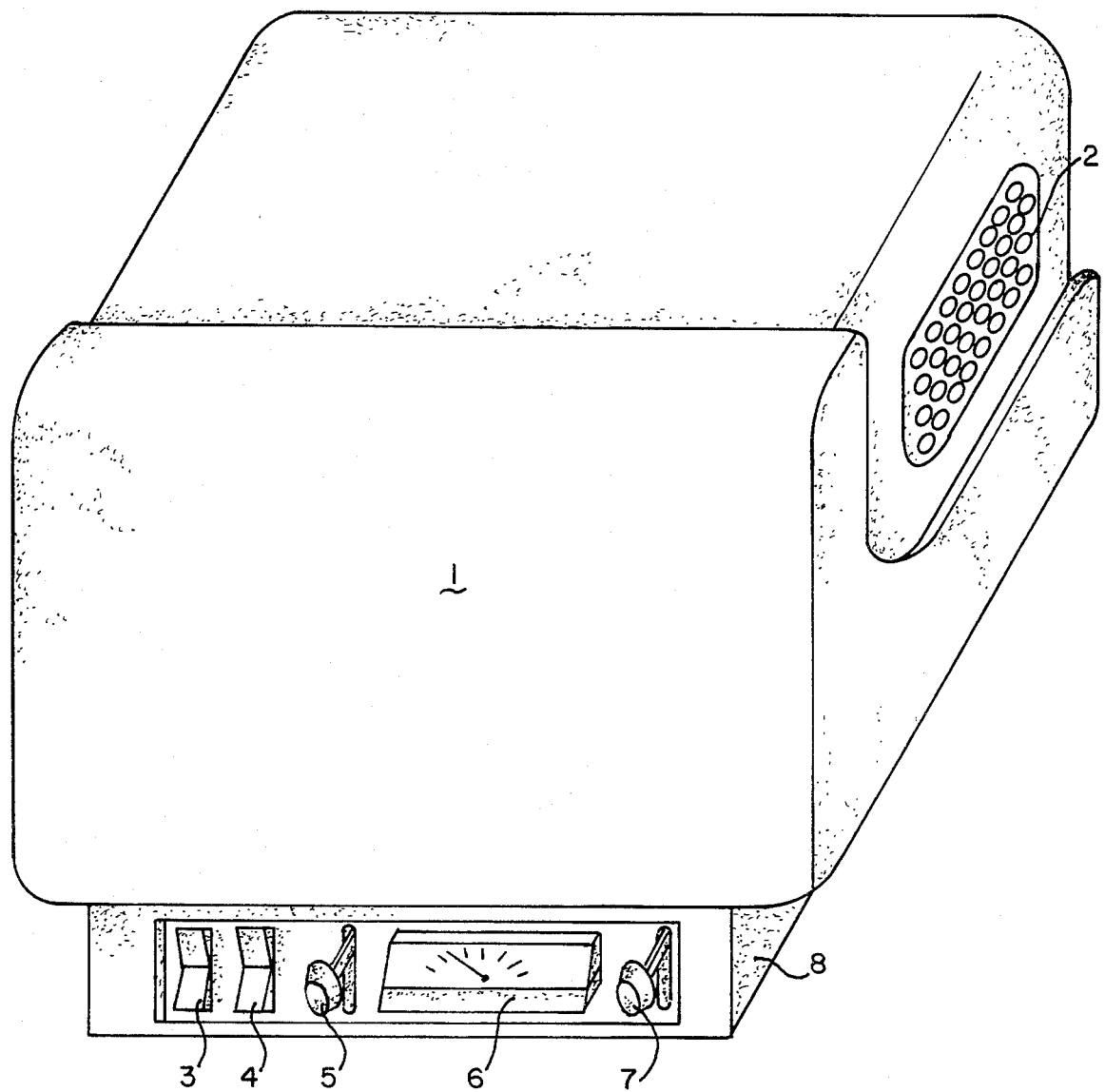
FIG. 1 provides an isometric view of the housing enclosed foodstuffs image processing and apparatus of this invention.
Figure 2:
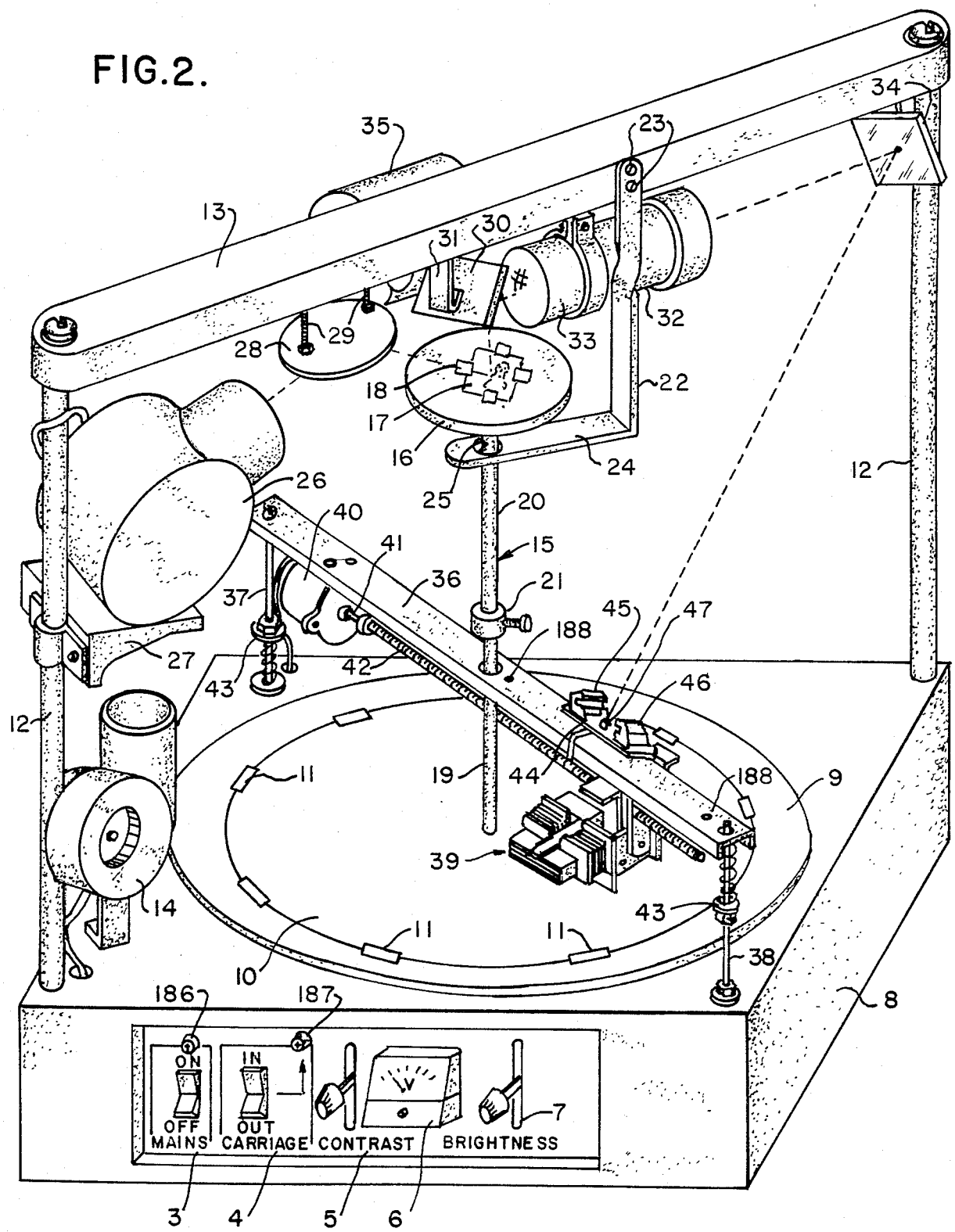
FIG. 2 provides an isometric view of the operating components for the image processing apparatus of one embodiment of this invention.

In referring to the drawings, and in particular FIG. 1, initially there is shown, by way of example, one of the preferred embodiments of the invention upon this foodstuffs imaging process and apparatus, and which in its packaged fabrication includes a cover 1 having vent apertures 2 located through the cover, and in this particular instance, being arranged through the sides, and the cover generally is hingedly mounted in order to provide for its pivoting upwardly so as to expose the operating components of the device therein, such as disclosed in FIG. 2. But, the unit also shows, as disclosed in these two figures, various control mechanisms including the main off/on switch 3, the switch for initiating carriage movement either inwardly or outwardly, as at 4, the switch means for controlling the contrast developed during the imaging process, as at 5, including an indicator dial at 6, for visually observing the intensity of the set contrast, and, then finally, a brightness control dial 7.

The specific construction of the prototype of this unit is shown in FIG. 2, and comprises the base 8 that holds the various motorized mechanisms, as for example, for providing for turning of the turntable 9 and upon which the sheet of edible material, as will be subsequently analyzed, as at 10, is located by means of gripping means 11, and held firmly in place in preparation for an image imprinting process to take place. A pair of upright stanchions 12 are mounted upon the base 8, and extend upwardly towards their upper ends where they have affixed thereto a crossbar 13 that is useful for holding various operating components for this apparatus. A blower 14 is bracketed to the surface of the base 8, and during operations of the device, and since there are various illuminating means and lenses incorporated into the operation of this apparatus, provides for dissipation of heat from its functional components during performance of the imaging process. And, as previously explained, such heat will be vented through operations of the blower from the arranged vent holes 2 provided through the cover 1.

Also provided for rotation simultaneously with the turn table 9 is an upright support 15 which is integrated into the construction of the motor mechanism (not shown) contained within the base 8, for providing simultaneous rotation for the said table 9. Upon the upper end of the support 15 is a platform 16, and which is of sufficient dimension so as to provide for a temporary mounting thereon of a photograph or other picture or image of that person or item intended to be transferred through the use of this imaging process. There is a photograph, as at 17, shown mounted by means of various adhesive or other fastening means 18 to the upper end of the surface. It is to be noted that the upright support 15 is actually a pair of components, such as the rod 19 that is fastened within the sleeve 20 and which two components are held relative with respect to each other upon fixing of the clamp 21. The reason for this feature is to provide a means for releasing the upper rod 15, so as to allow lifting and turning to the side the bridging assembly 36, for replacement of the foodstuff 10, in a manner very similar to lifting the arm for changing a record in a record player.

There is further shown a bracket 22 fastened to the cross arm 13 by means of the fasteners 23 and which bracket has a lower laterally extending portion 24 having an aperture, as at 25, provided there through and through which the upright support 15 extends and is stabilized in positioning.

The cross arm 13, as previously explained, extends between the stanchions 12, but this particular cross arm might be more aptly defined as an optics bridge, and which is useful for holding various image focusing and transferring means that cooperate rather effectively and precisely during the functioning of this particular apparatus. Initially, there is a light source 26 bracketed to the left side stanchion 12, and rests upon its supporting base 27, which when lighted, directs its lumins towards a mirror 28 which is supported by means of brackets 29 to the underside of the cross arm 13. The light is reflected by the mirrored surface towards the exposed platform supported photograph 17, with the image being reflected towards a second mirror 30 which is also held by means of a bracket 31 to the underside of the cross arm 13. The reflected image from the mirror 30 is directed through the series of projector lenses 32, which likewise, is bracketed, as at 33, to the underside of the said cross arm 13. Finally, the projected image is focused upon a further mirror 34 for reflecting, once again, at a downward angle and towards the direction of the printing means of this invention, which will be subsequently described.

There may be also provided upon the cross arm 13 a fan 35, which is useful, when operating, to direct some ventilating air directly towards the platform means, at the area of the photograph, in order to prevent the buildup of any heat thereat, which may possibly damage the photograph.

It can also be seen that an additional bridge means 36 is rather resiliently supported by means of spring biased rods 37 and 38 upon the base 8, and which essentially is disposed overlying the foodstuff 10, as secured upon the turntable 9, of this apparatus. Basically, this bridge means 36 is designed for supporting for operation the scribing head 39 that actually provides for the transmitting of the image, by means of scribing, printing, or the like, onto the surface of the arranged food means. Essentially, a small, geared, DC motor 40 is rigidly fastened to the underside of the bridge means 36, and its output shaft 41 connects with an axially aligned feed screw 42 that is mounted for rotation, in both directions, upon the underside of the said bridge means. This feed furnishes the means for driving, in one of two directions, the image scribing means, with the support for said means being afforded through the bridge means 36, as will be subsequently described. A pressure adjustment may be attained for the relative positioning of the scribing means 39 with respect to the foodstuff 10 through an adjustment of the adjustment means 43, operatively mounted upon the support rods 37 and 38, so that the degree of pressure exerted by the scribing head 39 upon the foodstuff, during its setting and functioning, can be precisely controlled, in order that a clearer physical manifestation and image of the picture being transmitted can be quickly attained.

Also provided upon the bridge means 36 is a frame 44, having a pair side braces 45 and 46, and into which may be slid, if desired and needed, a filter (not shown) which may be used for regulating image spectral distribution during its transmission. In addition, secured upon the frame member 44 is a phototransistor 47, which receives the point image being reflected from the photograph 17, and through which the intensity of the light of the image being transmitted is processed electrically for furnishing electrical pulses that regulate the intensity of energization and operation of the scribing means 39, during performance of the physical printing process upon the foodstuffs 10.

Figure 3:
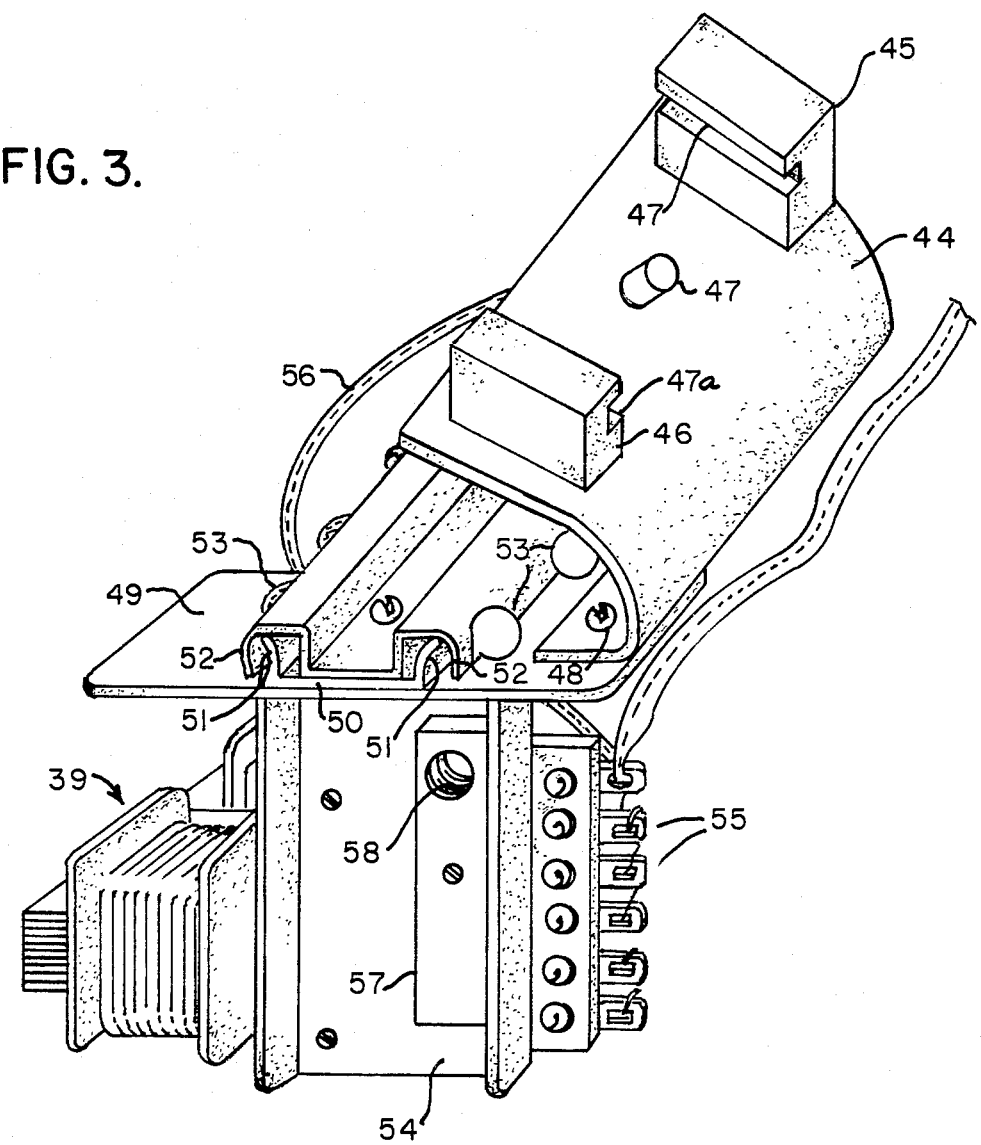
FIG. 3 provides an isometric partial view of the carriage means and scribing instrument of one embodiment of this invention.

FIG. 3 provides, as previously explained, a closer view of the scribing head means 39, as supported by the bridge member 36. As shown, the frame member 44 includes the two supports 45 and 46, and each of which are slotted, as at 47a, for holding any filter that may be required. In addition, the case of the phototransistor 47 is also shown as mounted upon the frame member. The frame member is bracketed, by means of the fasteners 48 to a plate 49, and the plate includes upright extending rail means 50, having the bearing arms 51 in close proximity with the bearing arms 52 of the bridge member 36, so that the retained bearings 53 provide for a near frictionless displacement of the member 50, which supports the scribing means 39, with respect to the bridging member 36, as the scribing member is slowly moved radially, either inwardly or outwardly, by means of the functioning of the feed screw 42, during operations of this imaging apparatus.

Extending downwardly from the base plate 49 are additional mounts, as at 54, and which provide various electrical fittings, as at 55, which furnish quick connection of the various terminals and electrical cables that emanate from the electronic controls of this particular device, as will be subsequently explained. In addition, similar type of electrical cable or wire means, as at 56, interconnect between the phototransistor 47, into one of these fittings 55, for further processing of the energized light converted signal to afford operations to the scribing means 39.

It can also be seen that provided upon the mount 55 is a threaded head 57, having its thread means furnished through an aperture, as at 58, and through which the feed screw 42 interconnects to afford movement to the scribing means 39, and in effect provides carriage for it between the extremes of its stroke during operations of this particular imaging process.

Figure 4:
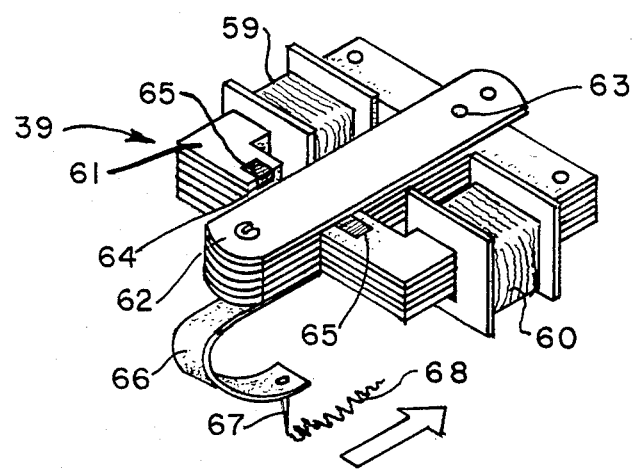
FIG. 4 provides an isometric view of the electro-mechanically operative scribing instrument of this invention.

The actual scribing means 39 is shown more accurately in FIG. 4. As constructed, this scribing means functions as a writing head, which physically reproduces or scribes image lines upon the foodstuff 10 and which scribe lines are regulated through the intensity of the light being transmitted through the imaging means, from the photograph, as at 17, so that an actual physical manifestation of the image upon the photograph is scribed directly onto the foodstuff, to provide a visually observable identical, or very nearly similar, image of that which is being transmitted.

This writing head 39 consists of two electromagnets 59 and 60, surrounding a common ferromagnetic core 61, with a slightly pivotal or shifting arm 62 being arranged, at one end, pivotally mounted by means of a pivot pin 63 to the core 61, while at its approximate opposite end the said arm 62 is free to slightly shift within a formed air gap 64, with the degree of shift being fixed and determined depending upon the space of the gap 64, and any nonferromagnetic bumpers 65 provided approximate the air gap disposed surfaces of the core 61. When one of the two electromagnets is energized, as when a signal is transmitted from the phototransistor, after conversion to energization, the pivot arm 62 shifts slightly, as within a vibratory-like movement, until it hits one of the bumpers, or both of the same, during its reciprocal type shifting within the air gap, depending upon the intensity of the signal being transmitted to electromagnets 59 and 60. When the electrical energy is released from one or both of the electromagnets, or when the other electromagnet is being activitated, the arm moves in an opposite direction, in order to establish these vibratory or reciprocal like motions for the arm 62. This movement is transferred to the arm held spring lever 66, and thence to its stylus 67, which two components are reasonably firm in their construction, but having some flexibility for slide vertical displacement, so that there is applied a rather constant pressure in the vertical direction through the writing head or stylus to the foodstuff 10 upon which the lines of scribe, as shown at 68, are being made. Actually, as described herein, it is hinted that the lines of scribe are made directly to the surface of the foodstuff 10, and in certain instances this may be desirable, but in the preferred embodiment, and as will be subsequently analyzed, the tranfer of the image is actually made through the usage of a transfer sheet, that through the stylus impresses and transfers a color or the like to the surface of the foodstuff, during image transfer.

The actual physical dimensions for the stylus 67 may be to that degree which most effectively provides for the transfer of an image to the surface to the foodstuff, and yet not tear the foodstuff or transfer sheet it uses. It may either be in the form of a pointed object, or perhaps rounded at its lower dimension, in order to afford the degree of clarity, or homogenous color transfer, that obviates the appearance of scribe lines, where uniformity of color or image is desired as transferred to the foodstuff.

It must also be recognized, as previously explained, that the image upon the photograph 17 rotates in unison with the turntable 9, and the speed and degree of turn of the feed screw 42 holding the scribing means 39 is likewise closely coordinated thereto, so that precise image transfer takes place at a time when the actual facsimile of the photographic image will be transmitted to the surface of the foodstuff, so as to avoid any discoordination that may otherwise prevent the visual transfer of the image, or furnish lines of aberration in the transferred image that detracts from the quality and degree of its appearance.

Figure 5:
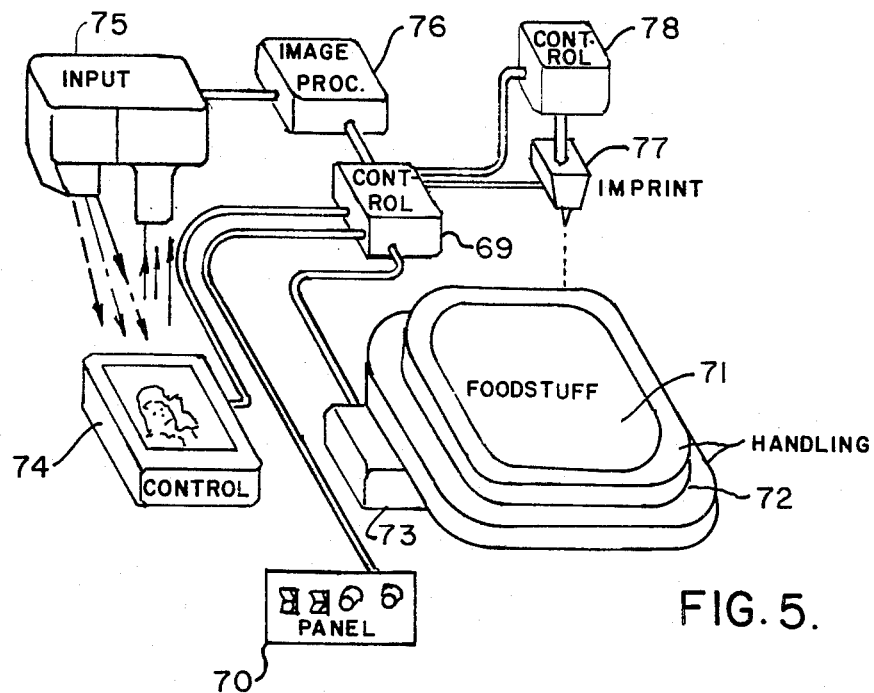
FIG. 5 provides a schematic view of the generalized operating concepts of this invention.

A number of schematics may provide a resume of the several mechanisms and electronic control mechanisms that generally provide for operation of this invention, and which will provide a lead-in to the detailed arrangement of the electrical components, electronic components, and ciricuit diagrams employed in the preferred embodiment. For example, in referring to FIG. 5, the main electronic control means 69 is initially turned on, and its various contrasts, brightness, and intensity parameters are regulated through the control panel 70. The various mechanical operating components of the invention, such as previously analysed, as for example the foodstuff 71 supported upon its handling means 72 and controlled through its mechanisms 73 are controlled from the control means 69, as aforesaid. Means for both sensitizing a photograph, or other image to be produced, such as mounted upon the base member 74 is achieved through an input control means 75, which not only provides means for sensitizing the image to be reproduced, but likewise receive signals, whether by means of photo sensitive means, scanning means, or any other form of detecting means, which are then processed and transferred to an image processing means 76, and which processes said data and transfers it to the control means 69, as aforesaid. From the control means further regulation is made of the imprinting means 77, by its servomechanism control means 78, and through the control means 69, both the operations of the imprint means, and the preparation of the foodstuff means 71 for reception of the imprint, is precisely regulated.

Figure 7:
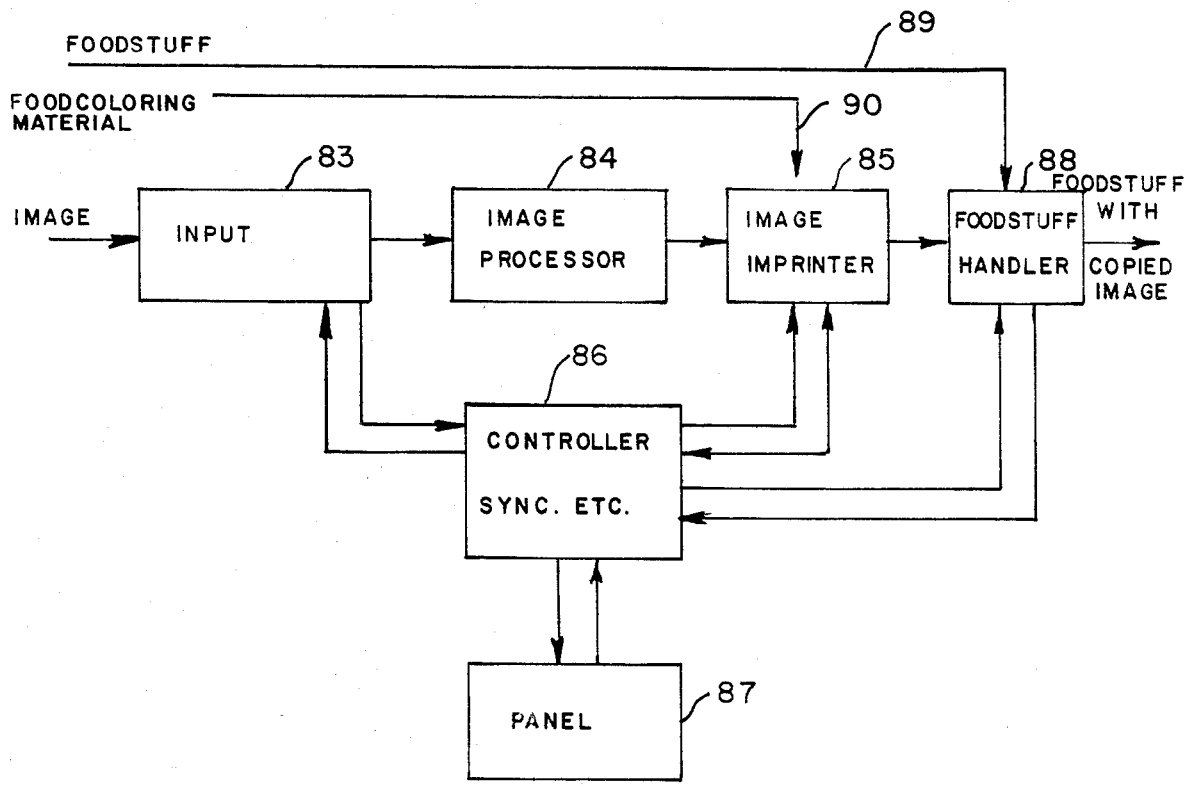
FIG. 7 provides a generalized block diagram of this invention.

A more generalized block diagram of this invention, is shown in FIG. 7. The image is inputted through input means 83, an image processor 84 processes the optical images into electric signals, which then transfers those signals to an image imprinter 85, such as the scribing head means 39 as previously explained. In addition, the input means 83 send signals to a control circuitry 86, which may provide for the synchronous operation of various other mechanisms, such as the panel 87 that may display the facimile of the image to be imprinted, and in addition, the controller 86 may provide for synchronous operation of the foodstuff handler 88, so that the operations of the handler, such as the turntable 9, will be coordinated with the operations of the image imprinter 85, such as previously explained with respect to the scribing head 39, so that the foodstuff with the accurately and visually perceptable image decorated foodstuff, or the like, can then be delivered as the end product. Obviously, the foodstuff will have already been delivered to the handler, as by means of a delivery system by way of line 89, and likewise, the food coloring means, for proper operation of the imprinter means 85, can be delivered to he image imprinter by way of proccessing line 90.

Specific electrical controls that may be used in select embodiments of this invention, and more particularly, the embodiment described in FIG. 2, are shown in FIG. 8.

The electrical schematics of the preferred embodiment is shown in FIG. 8. FIG. 8A shows the electrical connection of the various components which are connected to the mains supply via a receptacle 92 and the on-off switch 3. The power supply 91 is a typical d.c. regulated power supply with three regulated outputs, namely 12 V, 8 V and 5 V. These voltages are connected to the appropriate lines as indicated in FIGS. 8A and 8B. In addition, the turntable 9, the "on" indication light bulb 186, the fan 35, the blower 14, and the light source 26, are all connected to the switched mains supply lines 94 and 95. FIG. 8B shows the connection of the radial motor 40 and its indicating lamp 187. This motor 40 can move in two directions, as controlled by the position of the "in-out" switch 4. To avoid over movement of the scribing head 39, two limit switches are installed on the bridge 36 at the appropriate positions, as seen in FIG. 2. When the scribing head 39 assembly hits one of the limit switches 188, this switch disconnects the motor from the power supply line 189, and the motor can move only to the opposite direction by changing the position of the direction switch 4.

FIG. 8C discloses the electronic processing chain from the phototransistor 47 to the coils 59 and 60 of the scribing head. The light-induced current in the phototransistor 47 is driven to the base of a transistor 190. The transistor 190 is biased to operate in a non-linear mode, i.e. the collector current is approximately an exponential function of the base current. The non-linear gain is adjusted by the "contrast" resistor 5. Two resistors, 191 and 192, maintain proper limits of the contrast. The non-linearity was found experimentally to result better image quality than linear transformation. This is similar to "gamma correction" of image density in the art of photography. The collector current is converted to a voltage by a resistor 193. This voltage is further amplified by a simple operational amplifier 194, such as National Semiconductor type LM 324, which is connected as an inverting amplifier by the resistors 195 and 196, and a bias voltage is generated by adding current to the summing point 197 by a resistor 180, connected to a potentiometer 7 which acts as a "brightness" control. The output of the amplifier 194 is monitored by voltmeter 6, to ease the adjustment of the contrast and brightness controls. The pulse rate of approximately 60 hertz is generated by a free running oscillator 198 which is implemented by the industry standard timer type 555 in its free running mode. The pulses from the oscillator 198 are driven to another 555 timer 199, which operates in a monostable mode, so that the pulse rate is controlled by the oscillator 181, and the pulse width is controlled by the output voltage of the amplifier 194. A transistor 200 is connected as a current source by three resistors 201 in order to get linear dependency of the pulse width as a function of the control voltage from the amplifier 194. The pulses of the timer 199 are driving the two electromagnets 59 and 60 of the scribing head 39 via two drive circuits. The first circuit is a two-stage amplifier which includes a PNP transistor 202 with two resistors 203, and another NPN driver transistor 204, such as 2N3055, with a base resistor 205. The opposite electromagnet has a similar driver 206, but this driver is preceded by an open-collector logical inverter consisting of a transistor 207 and a resistor 208.

Figure 10:
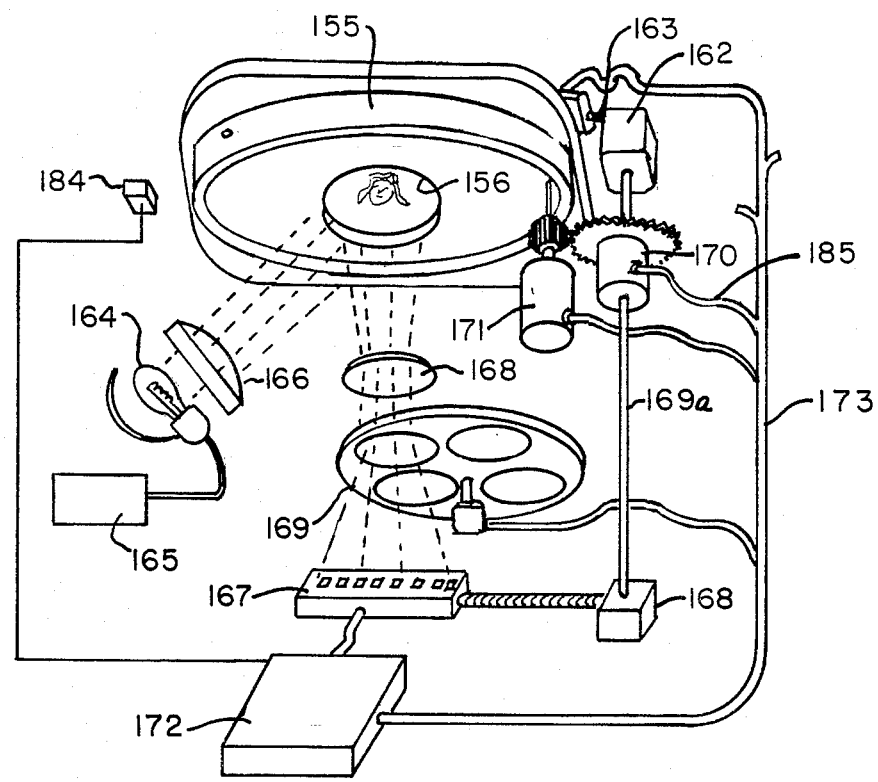
FIG. 10 is a schematic view of the internal operating optical components for the apparatus shown in FIG. 9.
Figure 9:
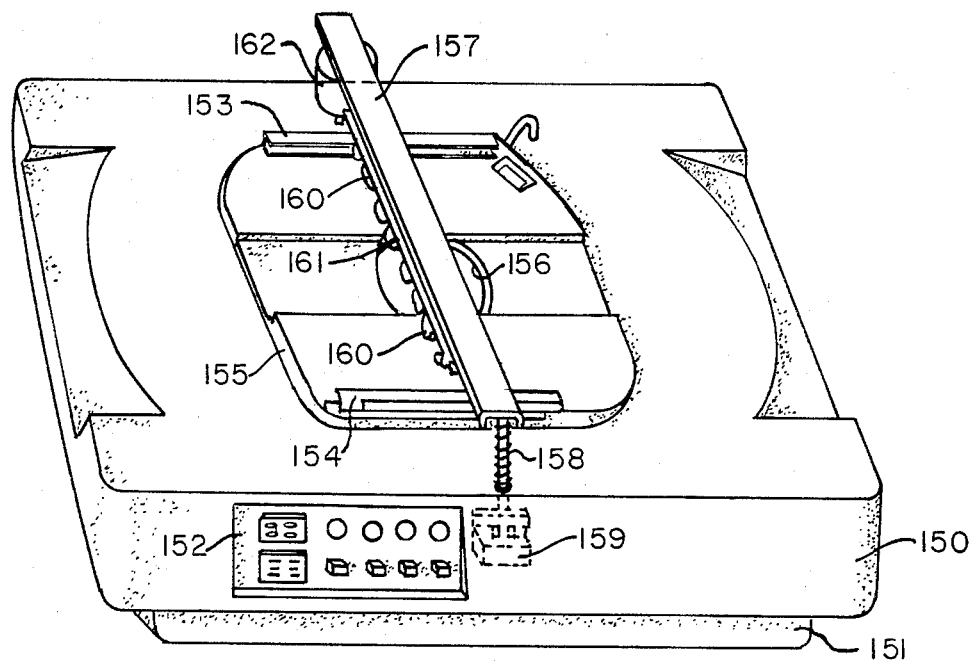
FIG. 9 provides an isometric view of a more portable type foodstuffs image processing and apparatus for this invention.

Whereas the embodiment for the imaging processing apparatus of this invention, as previously explained with respect to FIG. 2, is an example of the prototype of this invention, which operates quite effectively, and which may have industrial application, an example of a multi-scribing image reproducing apparatus of a more portable nature, and which may be used for small commercial operations, or even for domestic usage, is shown in FIG. 9. In this embodiment, the housing 150 mounting upon its base 151 has its frontal disposed control panel 152, functioning similarly to that which was previously described with respect to the apparatus shown in FIGS. 1 and 2. This particular apparatus is adaptable for receiving a cassette type food means to be imaged, and which will be subsequently explained, in greater detail, with a cassette designed for inserting within guide rails 153 and 154 of the turntable 155. An aperture, as at 156, is arranged for reception of the photograph or other pictorial image to be reproduced, as will be subsequently explained, with respect to the internal mechanisms that control the operations of this particular apparatus. And, it is also likely, although it is not shown, that any type of a tray means may be mounted laterally of this particular apparatus 150, in order to continuously feed the cassette means into the apparatus, for installation upon its turntable 155, to provide for continuous and repeated imaging of food means that may be used for decorating various culinary items, such as cakes, or the like. Automatic delivery means may function with any such carriage in order to automate this operation. A bridge means 157 is held up by means of spring supports 158, and is generally drawn down into a proximity relationship above the food means to be imaged by means of a control solenoid(s) 159. This drawing out of the bridge means 157 transfers the tips of the plurality of writing or scribing head means 160 into contact with the upper surface of any food means located upon the turntable 155. These scribing heads 160 are attached to for movement under the bridge means 157 by means of a shiftable carriage 161, the movement of which carriage, and its suspended scribing heads 160, is accomplished by means of a mechanized gear box 162. In also referring to FIG. 10, this gear box 162 is operatively associated with its feed screw 163 that provides for shifting of the carriage 161, during scribing operations of this apparatus. The aperture 156, as previously explained, being arranged through the central portion of the turntable 155, provides a location where the photograph or other means to be reproduced may be located, and to provide for its simultaneous rotation with the said turntable. The picture being reproduced is exposed to light coming from a light source 164, driven by its power supply 165, being respectively, an incandescent light bulb powered from a d.c. power supply. A direct current is used to avoid light flicker in the bulb 164. Light passes through a filter-condenser FIG. 166 that eliminates infrared radiation and shapes the spectral response of the light source to resemble white visible light most useful for good electrical reproduction of the image. This light is reflected or scattered from the photographic image, it is sensed by a semi-conductor light sensitive array 167. These may comprise an array of phototransistors, such as may be obtained from General Electric Company, Auburn, N.Y. under model number L14C1. The light after passing through the lens 168, and one of several filters 169, which have various spectral responses which are suitable for analysis of color components of the light, such as tristimulus components which are known in the art of colorimetry. The spectral response of said filters is also selected so as to compensate for the non-flat spectral response of the sensors 167. The combination of the light from the light source 164, the filter and condenser 166, from the photographic image contained within the aperture 156, and the lens 168, can be recognized and identified as an opaque projector to one familiar with the art of optical projection.

The position of the scribing heads 160 of this embodiment is kept sychronized with the projected picture elements. This sychronization is achieved with the aid of various gears, such as operatively associated within the gear box 162, in addition to the gears associated with the gear boxes 168, the drive shaft 169a, and the gears of the gear box 170. The turntable is turned by means of the motor 171, so that the turntable's rotation, combined with the precise movement of the carriage with its scribing heads 160, form a mechanical scanning system which scans the area of the cassette, generating a scanning pattern in the form of a helix, of concentric but continuous rings, or any other form of scanning pattern for the area. The shape of this pattern depends upon the distribution of the writing heads along the carriage. And, the gear box 170 is reversible so that the carriage can be moved in a reverse direction, when necessary, by electrical control of the processor 172, and the electrical connector 185.

It should be obvious that under an alternative procedure, parallel lines scanning methods could be employed, but one of the main reasons for preferring circular scanning is an aesthetic one, namely to distinguish the edible scanned image from those obtained on television screens, line printers, and the like.

Electrical signals which are generated in the light sensors 167 in response to the projected image, are fed into an electronic image processor 172. This will be described in FIG. 6. The main function of the image processor is to generate drive signals for transmission to the stylus of the scribing means 160. The signals are being transferred to the scribing head means by way of electrical cable 173, and since these writing heads have electromagnets associated with them, as previously explained, when energized, they cause a transversal vibration of its attached stylus over the foodstuff of the cassette, thus effectively varying the widths of the scanned or scribed lines according to the amplitude of the vibrations.

Figure 6:
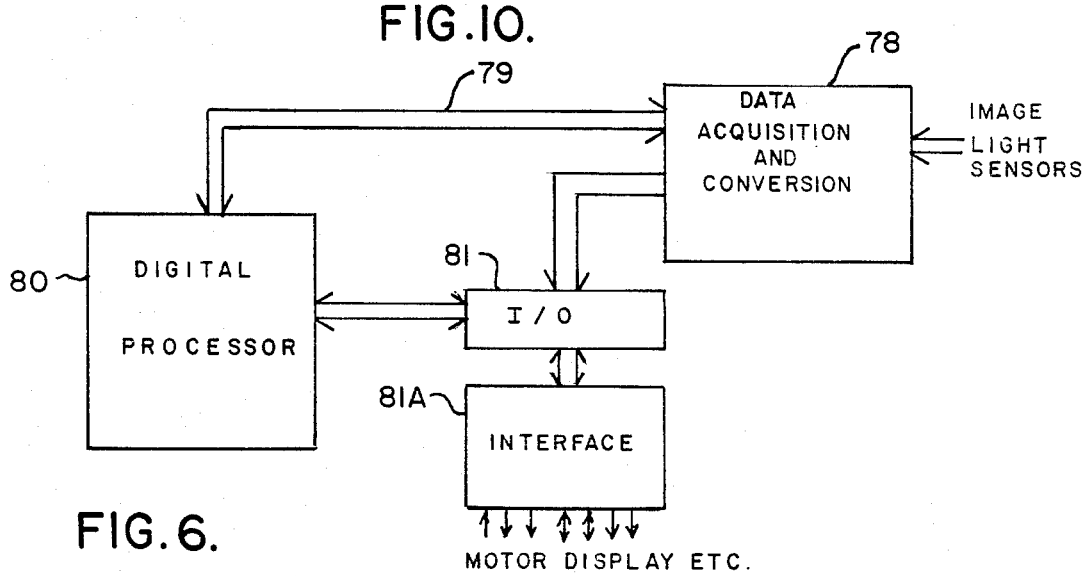
FIG. 6 provides a block diagram of generalized digital electronic controls which may be used with the various embodiments of this invention.

FIG. 6 affords a block diagram of a digital image processor of this invention, and more specifically the image processor 172. This particular processor may be use with any of the embodiments described in this application. The analogue signals at the light sensors 167, are received therein, are processed and sequentially scanned and converted to digital numbers by a data acquisition and conversion subsystem 78. This data acquisition card is available from National Semiconductor Corporation of Santa Clara, Calif. and this card, comprises model number ADS1216HC, is a 16-channel 12-bit data acquisition system and memory. The conversion and the scanning rate are carefully controlled by a bus 79, electrically connected with a digital processor 80. A typical scanning rate, such as performed by the input means, such as 167, as previously explained, may scan at the rate of sixty times per second. If an array of eight sensors are used, where a plurality of such sensors are utilized in conjunction with the operations of this apparatus, and which corresponds with eight writing heads, where a plurality of scribing head means are utilized, such as the one shown at 39, then 480 analogue to digital conversions per second will be required, with a preferred 8 bits resolution. These requirements are easily obtainable with current electronic techniques available upon the market. The converted numbers are input to the digital processor 80, as previously described, with the aid of an input/output subsystem 81. This subsystem comprises an integral part of any acquired subsystem 78, or processor 80. The digital processor 80 is a microprocessor with a program stored in its read/only memory (ROM). This digital processor 80 is a form of microcomputer board, and can be obtained from Motorola, Inc., of Phoenix, Ariz., and is generally identified as its Versa Monoboard Microcomputer #M68KVM01A1. The digital processor has two major tasks to perform, the first of which is related to image processing, in which the numbers, which have been entered from the data acquisition subsystem 78, are transformed into electrical pulses of a constant frequency (60 Hz) and variable duty cycle, wherein the duty cycle of the said output pulses, which correspond to the picture elements' brightness, are related to said input numbers through an image processing algorithm.

A preferred algorithm sets the duty cycle of each pulse according to the equation: Duty Cycle $= a(I+b)$, wherein a is a gain factor, and b is a bias factor, with both being kept constant at all times during copying of one image, and are being determined, before copying starts, by performing one idling cycle of the disk without writing, by keeping the solenoids, as will be subsequently explained, particularly with respect to the portable apparatus shown in FIG. 9, released, and finding the brightest and the darkest points in all of the sensors. When the idling cycle is complete, a is being set inversely proportional to the difference between the two extreme readings, and b is being set in proportion to the average reading of all of the points along the photographic scan. The variable $I$ is the current sensor reading. This algorithm is just one example of many other algorithms available in the art of image processing, and which are suitable for this current image processor and apparatus.

The second task of the digital processor 80 may be colloquially called "housekeeping". It includes several auxillery tasks such as scanning the front panel keys 152, scanning position sensors, such as an optical position sensor 186 shown in FIG. 10 that senses the angle of the turntable 155. Such might be needed in order to count the number of revolutions of the platform, turning motors on and off, as required, acknowledging operators error messages on the panel, and other control tasks. These housekeeping tasks and the image processing tasks are being carried out by software means and by hardware means, which may include a bi-directional electronic interface 81A, which contains various components, such as power transistors, optically coupled thyristor triggers, comparators, and the like.

Figure 11:
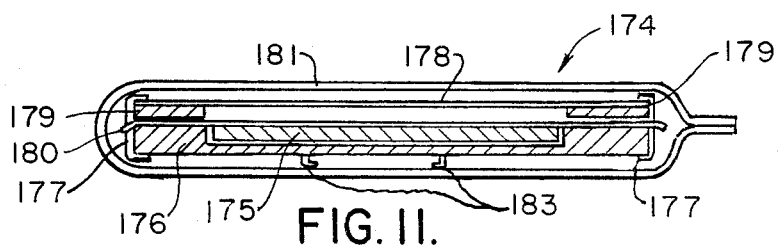
FIG. 11 provides a sectional view of a cassette holding the foodstuffs and transfer sheet of this invention.
Figure 12:
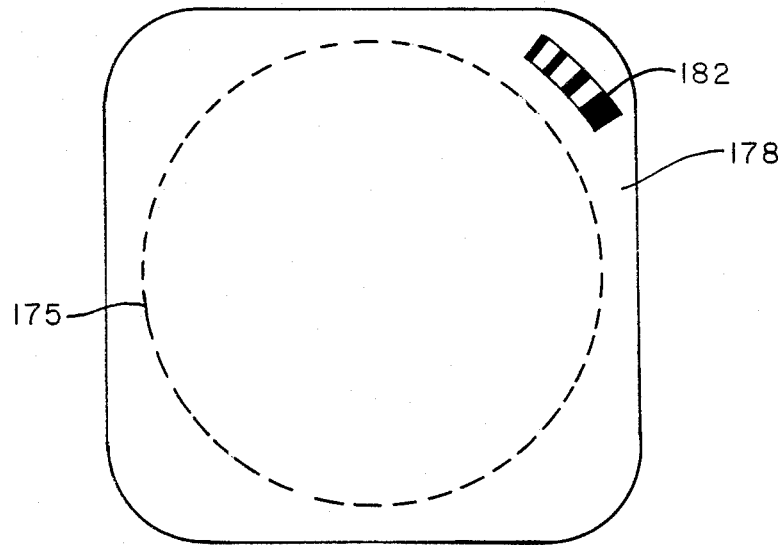
FIG. 12 provides a plan view of the invention shown in FIG. 11.
Figure 13:
FIG. 13, as previously mentioned, provides an angulated view of an actual reproduction of an image upon a birthday cake as processed through the apparatus of this invention, showing scribed reproduction just explained.

As previously explained, a cassette type of arrangement may be made for the foodstuff means to be imaged under this process, and it may be one that may be packaged for ease of marketing for both industrial purposes, or even to the home owner or small commercial establishment, and that employ the food imaging means and apparatus of this invention. As shown in FIGS. 11 and 12, one such cassette is disclosed. This pre-packaged cassette means, as at 174, includes a sheet of the foodstuff 175 that is to be imprinted. The type of foodstuffs involved will be thoroughly analyzed subsequently in this applicaton. The various dimensions disclosed for the arrangement of the components for this cassette means are rather accentuated, in order to better show the type of components involved, their relationship to one another, and how they may be properly used. Actually, the dimensions of spacing for these various components will be smaller than and not as large as that shown in these drawings, in order to maintain contiguousness for the parts held by the cassette. The foodstuff 175 to be imprinted, or colored, is supported upon a relatively nonflexible packaging type of material, as at 176, and this base material may be any form of paperboard, cardboard, that may be laminated with wax, plastic, foil, or the like, in order to add safe structural support for the components. Rail means, as at 177, may be provided extending from the lower side of the base means 176, and may cooperate with the rails 153, and 154, of the turntable, in order to allow for quick installation of the cassette therein for ready usage and processing by the apparatus. An image transfer sheet 178 is attached to a peripheral frame 179, in order to provide separation of the transfer sheet from the food means to be imprinted, and to prevent the unauthorized or untimely contact of the transfer sheet colors to the said food means. In addition, having a peripheral frame 179 located at this location, means that it may be removed, since it may only be releasably adhered to the base member 176, so that other color transfer sheets may be located thereon, where multiple coloring for the processed imaged may be desired. A relatively thin film 180 is arranged intermediate the transfer sheet 178, and the food means 175, so as to prevent the premature transfer of any coloring to the foodstuffs, in the event that rough handling may occur for the cassette 174. And, the entire cassette may be enclosed within a flexible packaging material 181, although its flexibility may not be too great so that sufficient protection can be provided to the cassette components located therein. And, when the cassette is ready for usage, the packaging material 181 may be simply torn free to reveal the cassette for installation, upon the turntable, and at the same time, the separating film 180 may be removed or pulled free so as to provide clear exposure of the transfer sheet 178, and its coloring composition to the food means 175. Obviously, the coloring means upon the transfer sheet will be upon its interior surface, directly above the food means there below. And, as previously explained, the dimension between the transfer sheet 178, and the food means 175, is minuscule, so that all the stylus needs simply do is slightly touch upon the transfer sheet in order to achieve a contact transfer of its coloring means to the food sheet 175. Once the packaging material 181 is removed, and as can be seen in FIG. 12, the transfer sheet 178, overlying the food means 175, is readily disposed, and there may also be provided or imprinted various identification marks, as at 182, upon the surface of the transfer sheet, so that these marks may provide ready identification of the various coloring ink or inks, or other means that are provided upon the transfer sheet, and which could be sensed by proper sensors upon the apparatus when installed in order to provide further regulation for the type of image processing algorithm that may be used for that kind of transfer sheet, and the cassette, during food means imaging. For example, these marks 182 may be sensed before the copying stage and before stylus application is performed, such as when the turntable may advance through idling rotation, under the control of the apparatus, and assign various binary numbers to the signals from the sensors in order to select the right filters that will be necessary for furnishing proper optics that are required for obtaining an image from the photograph, or other means to be copied, and to assure proper operation of the various sensor means, such as the light sensitive array 167, as previously explained. Proper filtering within the processor is necessary in order to prevent the improper combinations of foodstuff and transfer sheet that may be mistakenly inserted into the apparatus in preparation for an imprinting operation, Another feature that may be incorporated into the cassette are slotted supports 183, to which the photograph may be fixed, to enable insertion of both the foodstuff means and the photograph, as a cassette, in the same, single insertion operation.

The pressure sensitive transfer element or sheet 178, usually in the form of a sheet, is conceptually similar to non-edible carbon paper and the like. Upon applying pressure to various segments of the sheet, thereby slightly shifting the transfer sheet close to the surface of the foodstuff means 175, edible coloring material is transferred between the sheet and the food means, only in those segments wherein pressure has been applied by a stylus. The transfer can be made either from the foodstuff to the sheet, assuming that the foodstuff has been pre-coated with a thin opaque layer of different coloring material, or it can be transferred from the transfer sheet as edible coloring material to the surface of the food means 175 itself. When such occurs, it causes a color change in the food means, upon its surface, directly where the stylus is applied. When the transfer sheet is applied during the image copying process, and particularly when it is desired to obtain multi-color edible pictures, a transfer from the sheet to the food means is preferred, since it enables coloring of the food means by several exposures from the same light source image with different and replaceable color transfer sheets. The image obtained this way is a proper color copy of the source image if the proper filter, such as the filter 169, and proper color analysis, and synthesis of algorithms, are all cooperatively combined during usage of this image processor.

The preferred transfer sheet consists of a flexible foundation made of paper, fabric, cellophane, polyethylene, or other forms of plastic or resin or the like, with an inner surface which is capable of holding an edible ink, or other coloring means. For example, a transfer sheet may consist of a thin, non-toxic film filament paper, to which an edible hydrophilic ink is applied, and which upon drying, a powder-like coating remains on the surface of the paper, wherein said powder is loosely bonded to the paper by an edible adhering material. When pressure is applied, particles of the powder are pressed into the surface of the food means 175, and released thereby from the foundation of the transfer sheet itself.

The edible ink useful in this invention may include a liquid hydrophilic portion, which acts as a solvent, suspender, crystallization retarder, and carrier, and may be made of 25 percent to 95 percent of a colorable and edible ink fluid material, consising of a combination of water, glycerol, propylene glycol, and ethanol. A solid portion of the ink, and which is dissolved and/or suspended in said liquid, to act as a binder material, or a bonding agent, in addition to having crystallization retardent attributes, and anti-microbial additive element, and which is added to the composition to between about 1 percent to 50 percent of the ink, may consist of a combination of sucrose, dextrose, sorbitol, mannitol, corn syrup, and edible gums. A lypophilic plasticizer, designed to be less than 10 percent of the coloring ink, consists of an edible oil or fat and emulsified in a hydrophilic portion with an emulsifier having a high HLB, such as polysorbate 80. The coloring material, which may comprise between 2 percent to 80 percent of the ink, consists of a combination of edible dyes and pigments. The preferred proportions among these ingredients that comprise the transfer ink or coloring ink of this invention depends upon the moisture absorbency of the foundation material, and, as an example of an ink for a white transfer paper, suitable for application to a dark colored foodstuff, the following proportions are given as an example:

| | |
|---|---|
| water | 38% |
| glycerol | 16% |
| propylene glycol | 22% |
| sucrose | 3% |
| corn syrup | 3% |
| titanium dioxide | 18% - as the main pigment |
| F.D. & C. yellow No. 5 and F.D. & C. red No. 3 - as dye stains, | less than 1% in combination |

In case the foodstuffs does have a dark color, as previously explained, and the transfer sheet carries a light opaque color, i.e., as in a case of "white mark on black background" image, wherever the picture element is to be dark, the pulse duty cycle in the electromagnet of the scribing head is set at one hundred percent operation, while the opposite electromagnet get a zero duty cycle pulse, and since very little or no movement occurs, the printed line is very narrow, so that the dark background dominates the picture element as transferred. If, on the other hand, the picture element is maximally white, a pulse duty cycle of fifty percent is applied through the electromagnets, causing the arm movements to pivot at full amplitude and filling the foodstuff with the light color. Intermediate brightness levels will cause intermediate duty cycles of operation, accordingly, and intermediate amplitude of vibrations cause an intermediate degree of brightness of the printed picture element. This writing through the use of the printing inks of this invention, as applied to varying color food base means, enables pressure transfer despite the relative softness of the foodstuff.

Various considerations have been given to the actual consistency, and composition, of the foodstuffs means to which the coloring image is to be applied. The image receptive food means may comprise a foodstuff with properties which are suitable for obtaining good printability through the copying process, or transfer process, and yet possesses food qualities which make it attractive and similar to the conventional foodstuff, in addition to flavorable to the appetite and taste buds to be served. It may consist of the original foodstuff normally used in conjunction with these type of edible products served, or it may be formed to other consistencies that are readily adaptable to receive printed images of the type disclosed herein, and yet blend favorably into the appearance of the final food product as it is served, and do so in an appetizing manner.

Where the invention is used for imprinting an image upon cakes, and for the broad variety of cakes available, a sheet of the food means made for usage with this invention may comprise a modified confectioner's coating of cake filling or icing as normally applied. But, in order to be manipulated in the manner as is the foodstuffs 175 of this invention, or for that as previously analyzed at 10, with respect to the operations of the apparatus of FIG. 2, the food means must be improvised in its consistency in order to be individually and independently handled and processed prior to application to the surface of a cake, or other food means. Generally, confectioner's coating is made from hard fat, with other additives, such as the confectioner's coating generally described in Ockerman, entitled "Source Book For Food Scientist" AVI Publishing Co., 1978, at page 410. The modifications to the icing or confectioner's coating, and which may be to any shade or colors desired, such as of the vanilla, chocolate colors, or any of the intermediate dyed shades, require additional ingredients and modifications in order to enhance their texture for handling in the sheet form and for being hard enough to accept the stylus pressure. These modifications entail the mixing of the original food with a fibrous, elastic edible material and shaping the mixture into the form of a sheet. The fibers may consist of protein, cellulose, amorphous sugar, or gels. An example of the image receptor, and which is compatible to the transfer paper with the white ink of the example explained above, is a mixture of twenty percent to eighty percent of molten confectioners chocolate, and a twenty percent to eighty percent ingredient of marshmallows, or related type of fibrous material, such as the marshmallow textured material described in the U.S. Pat. No. 3,490,920, to Grettie, et al. In addition, other candy with gelatin base fibers, mixed to obtain a fibrous phase of the marshmallow in the fatty chocolate matrix may be employed. The preferred mix consists of chocolate in the range of seventy five percent, and marshmallow in the range of twenty five percent, thoroughly mixed, in order to provide a moldable texture that may be rolled into the sheet form, slightly dried, and then usable independently in the manner as explained for the food means of this invention.

The manufacturing process for making the image receptor foodstuff means of this invention consists of dispersing the fibrous phase into the fatty phase and continuously mixing the same, into a thorough mixture, and then extruding the same through an extruding slit, with the further option of passing the extruded sheet also between a pair of adjacent rolling cylinders to make it thinner, smoother, and then placing the sheet on a packaging material, such as similar to the base member 176, as previously explained. The combination of materials may then be dried and cooled either by machine, or naturally. For the fabricated chocolate-marshmallow combination, the process consists of pouring the molten chocolate, at a temperature between about 90° F. to 135° F., into the molten marshmallow, which is maintained at a temperature between about 135° F. to 180° F., and then mixing them with a low shear rate mixture, extruding the mix through the extrusion slot, and continuing the process in order to obtain a sheet of the same. Once the sheet of material is obtained, it may be dried, cooled, and then cut to the dimensions desired, and applied to the turntable, such as a turntable 9 of FIG. 2, or in the alternative, may be packaged into cassette form, as explained with respect to that shown in FIG. 11, and rested upon a base member 176, prior to packaging and usage. Following this, the food means, as developed, may be applied to the various apparatuses described herein, and the image transferred directly from the photograph or other pictorial member and from which an image is desired to be derived and directly imprinted onto, in some semblance, the food means of this invention. It is likely that other forms of edible foods may be fabricated into the sheet form as herein explained, be furnished with a texture that would allow it to be handled independently by one of the apparatuses of this invention, and having an image directly applied to it by the coloring transfer sheet, in combination with the stylus means, during the operations of one of the apparatuses described herein.

Variations or modifications to the invention as described herein may occur to those skilled in the art upon reviewing the subject matter of this invention. Such variations, or modifications, if within the spirit of this invention, are intended to be encompassed in and protected within the scope of any claims to patent protection issuing upon this invention. The description of the preferred embodiment set forth herein is done so for illustrative purposes only.

Having thus described the invention what is claimed and desired to be secured by Letters Patent is:

1. An apparatus incorporating integrated components for reproducing images onto relatively soft foodstuff, or the like, including inputting the image from a pictorial or other representation and processing it for transfer through scribing or related means onto such foodstuff, comprising, support means for the apparatus for supporting its various integrated components, foodstuff accommodating means included in said support means for handling of said foodstuff during image reproduction, input means scanning said pictorial representation and operatively associated with the apparatus for optically inputting of the pictorial representative source image, image processing means electrically connecting with the input means and provided for converting the optical images into electrical signals representative of the source image and for further processing of said electrical signals, means for imprinting the representative image onto the foodstuff, said imprinting means connecting with and responsive to said image processing means for imprinting of the representative image onto the foodstuff, and transfer means incorporated in said imprinter means and when actuated effecting scribing or other transfer of the representative image onto the foodstuff.

2. The invention of claim 1 and including a turntable means for the apparatus, said support means including a housing, said turntable means supported upon the housing, and disposed for rotation thereon, the foodstuff mounted upon the turntable during image transfer, means operatively associated with the housing for supporting the pictorial representation during image transfer, and the support means and turntable being rotated in unison during apparatus operation.

3. The invention of claim 2 and wherein the input means optically lifting the image and including electronic processing means receptive of the optically converted signals and functioning to process said signals while coordinating the operations of the said apparatus during the image reproduction upon the foodstuff.

4. The invention of claim 3 and wherein the means for imprinting the representative image includes a scribing means, and electro-mechanical operative means operatively associated with the scribing means, a scribing head responsive to the energization of the electro-mechanical means and functioning to scribe the transfer of the representative image onto the foodstuff.

5. The invention of claim 4 and wherein said electro-mechanical means includes a pair of magnetic cores, each said core having an air gap provided at one location, a pair of electromagnets located at discrete locations upon each of the said core, a reciprocal arm pivotally mounted with respect to each said core, and disposed for vibrating like movements within its formed air gap, and the said scribing head securing with the reciprocal arm and disposed for transferring of representative image onto the contiguous foodstuff.

6. The invention of claim 5 and wherein there are a series of said imprinting means operatively associated with the apparatus and for simultaneously imprinting a segment of the pictorial representation onto the foodstuff during apparatus operation.

7. The invention of claim 4 and including a bridge means disposed in spaced relation with the turntable means, said bridge means incorporating means for shifting the imprinting means sychronously with the rotation of the turntable means for transferring the representative image onto the foodstuff.

8. The invention of claim 7 and including a feed screw means supported in proximity with the bridge means, motor means operatively associated with the feed screw means and provided for effecting its rotation during apparatus operation and for shifting of the imprinting means during image transfer.

9. The invention of claim 8 and wherein said image transferring means being bearing mounted to the bridge means.

10. The invention of claim 4 and wherein said image transfer means scribes the image of the pictorial representation onto the surface of the foodstuff.

11. The invention of claim 4 and including a transfer sheet, and said image transfer means scribing the image of the pictorial representation through the said sheet and onto the surface of the foodstuff.

12. The invention of claim 11 and wherein said image transfer means capable of pressure sensitive application of the representative image onto the foodstuff.

13. The invention of claim 11 and wherein said transfer sheet capable of reproducing color images onto the surface of the foodstuff.

14. The invention of claim 11 and wherein said transfer sheet and foodstuff are embodied in a cassette.

15. The invention of claim 4 and wherein the optic means for inputting the pictorial representation source image includes opaque projector means.

16. The invention of claim 4 and wherein the optic means includes camera means.

17. The invention of claim 1 and wherein the means for processing of the representative source image includes a light sensitive semiconductor means.

18. The invention of claim 17 and wherein said light sensitive semiconductor means converting the source image from an optical image to electronic signals, and digital processing means processing these said signals for energization of imprinting means for transfer of the representative image to the foodstuff.

19. The invention of claim 4 and including light means illuminating the pictorial representation for facilitating its optical transfer to the processing means.

20. The invention of claim 2 and including electromechanical means responsive to the processing means and facilitating the regulated turning of the support means and turntable means in sequence during transfer by the imprinting means of the image to the surface of the foodstuffs.

* * * * *